Sept. 26, 1967     R. E. KENNEL ETAL     3,343,633
BRAKE RELEASE MECHANISM
Filed Dec. 28, 1962
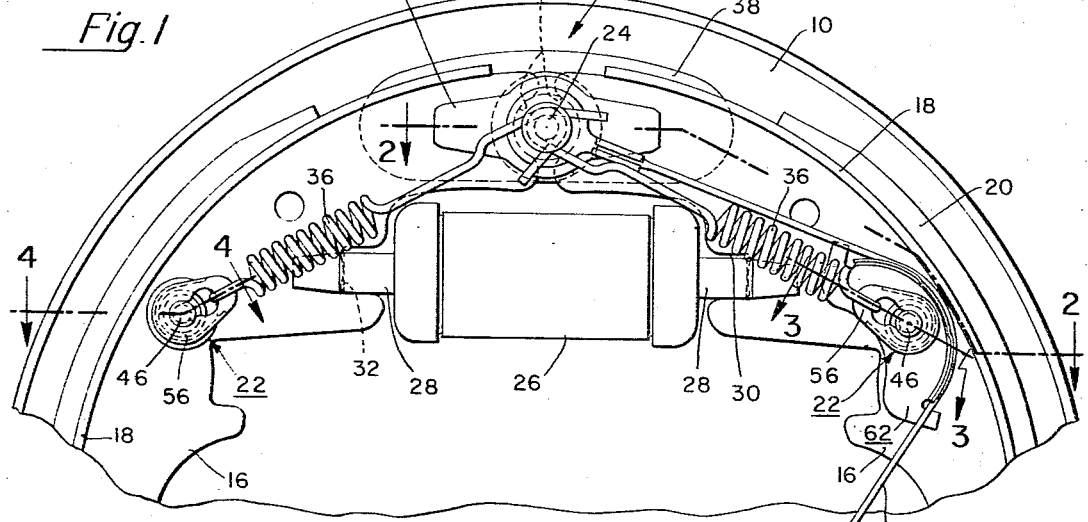
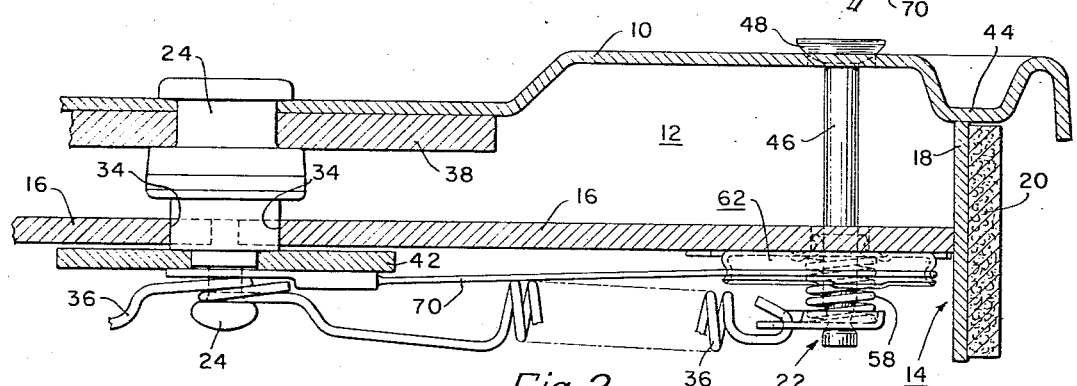
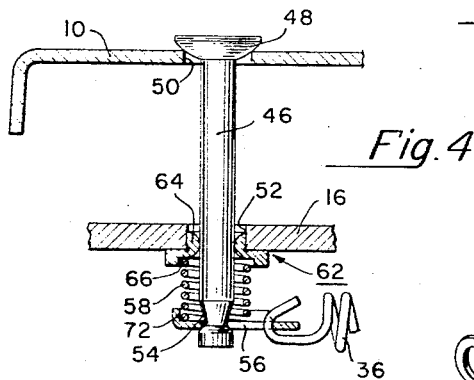
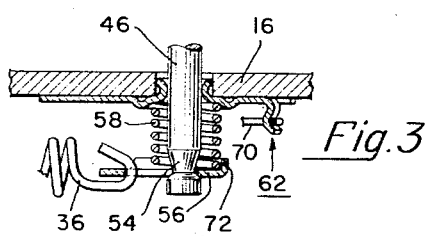
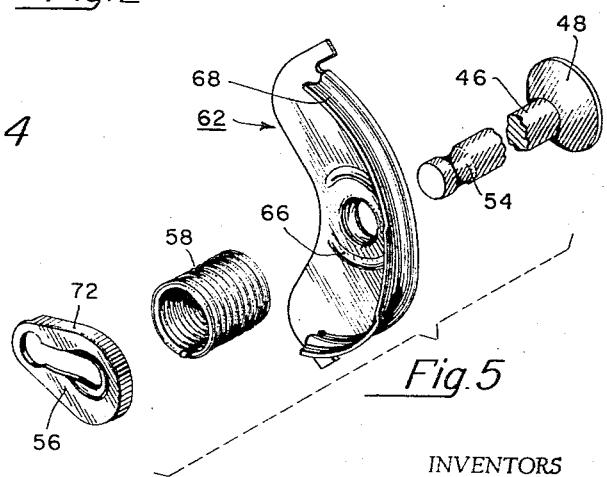
INVENTORS
J. EDWARD HAUG
ROBERT E. KENNEL
John B Sowell
ATTORNEY

United States Patent Office 3,343,633
Patented Sept. 26, 1967

3,343,633
BRAKE RELEASE MECHANISM
Robert E. Kennel, Grosse Pointe Park, and John Edward Haug, St. Clair Shores, Mich., assignors to The Budd Company, Philadelphia, Pa., a corporation of Pennsylvania
Filed Dec. 28, 1962, Ser. No. 247,923
5 Claims. (Cl. 188—78)

This invention relates to brake shoe return structures and more particularly to an improved device for returning the brake shoes to a normal position after being activated.

In recent years, automobiles have been made both heavier and faster. These automobiles are generally provided with automatic transmissions and wheels of smaller diameters. Improvements in rubber tires have provided better traction. The combination of automatic transmissions with no braking effect, increased weights, higher speeds, and increased traction have imposed greater loads on brakes which now must be overcome with smaller brake drums due to a decrease in wheel size. Brake lining area has been increased by extending the liner in the axial direction and brakes have been improved by employing power brakes and/or self-energizing brakes. The excessive brake shoe lining wear accompanying the increased load on the brakes has necessitated automatic brake shoe adjusters such as those shown in the Bendix Company Patent No. 2,978,072. Automatic adjusters tend to maintain a close tolerance between the liner and the brake drum during the life of the brakes. Brake shoes which maintain a close tolerance between the liner and the brake drum should move in a fixed plane so as to permit substantially uniform surface engagement of the entire brake liner with the interior surface of the brake drum. Further, the liners should substantially simultaneously disengage the inner surface of the brake drum. It is the practice in presently manufactured brake drums to align the push rod of the wheel cylinder with the web of the brake shoe for activation by axially aligned forces and to place springs on the brake shoes which are not axially aligned with the web of the brake shoes for retraction of the brake shoes. It has been found that retraction devices employed heretofore tend to twist the brake shoes when they are returned to their normal position after being activated. While there are devices which maintain the brake shoes in a constant plane they are usually expensive and lose their alignment due to wear and often impose forces on the brake shoes which tend to oppose the action of the wheel cylinder. Retraction devices are ordinarily provided as separate and independent elements from the brake shoe mounting structure and eventually impose lateral forces on the web of the shoes. Imperfect alignment and twist can cause the brake shoes to lock so that they cannot be retracted by the retraction springs; such conditions are undesirable as they lead to deterioration of the brakes.

Therefore, it is a primary object of the present invention to provide a brake shoe retraction structure which serves the dual purpose of a mounting structure and imposes a retraction force in axial alignment with the centrally located web of a brake shoe.

It is another object of the present invention to provide a novel bearing bushing cooperating with an alignment rod and retraction spring of a drum type brake.

It is a further object of the present invention to provide a brake shoe retraction and alignment structure having parts that serve dual functions in achieving a new and improved result.

In accordance with the present invention there is provided in a drum type brake having a backing plate, an alignment rod inserted through an aperture of the backing plate and an aperture of the web of a brake shoe, a bearing bushing inserted in the aperture of the web providing a bearing surface for the alignment rod, said alignment rod being pivotally mounted on said backing plate, a coil spring, a slotted keeper interfitted on a recess of the alignment rod for urging said coil spring against said web of the brake shoe to engage said brake shoe with said backing plate, and a retraction spring attached to said keeper at one end and to the anchor pin at its other end for applying a force to the bearing bushing in axial alignment with said web of said brake shoe.

Other features and objects of the invention will be found throughout the more detailed description of the invention and its manner of operation the description is supplemented with the accompanying drawings wherein:

FIG. 1 is a partial elevation of a typical self-adjusting type servo brake employing the present invention;

FIG. 2 is a section in plan view taken at lines 2—2 of FIG. 1;

FIG. 3 is a section taken through the alignment rod at lines 3—3 of FIG. 1;

FIG. 4 is a section taken through the alignment rod at lines 4—4 of FIG. 1;

FIG. 5 is an exploded view in perspective of the novel mounting, alignment, and retraction means.

Referring now to FIG. 1 the backing plate 10 is rigidly mounted to a flange assembly (not shown) and serves as a mounting plate for the brake assembly 12. The brake assembly herein illustrated is a duo servo brake having an automatic brake adjuster.

This brake provides two shoes 14 comprising webs 16 and rims 18 on which liners 20 are attached. The shoes 14 are floatingly held against the backing plate 10 by ball pivoted aligning devices 22 which maintain normal engagement of the rim 18 with the backing plate 10. In the normal retracted position webs 16 engage anchor pin 24. Wheel cylinder 26 actuates the brake shoes by spreading the shoes outward acting through push rods 28 interfitted at one end with slots 30 and grooves provided on rods 28 and web 16 respectively. The liners 20 engage the brake drum (not shown) in the well known manner imparting rotational movement to the brake shoes 14 and causing one of the shoes to engage its slotted end 34 on the anchor pin 24.

The brakes are de-energized or de-activated by retraction or return springs 36 acting between ball pivoted aligned devices 22 and the anchor pin 24.

Backing plate 10 is provided with a reinforcing plate 38 held to plate 10 by anchor pin 24 as shown in FIGS. 1 and 2. Guide 42 is mounted on a recessed face of anchor pin 24. This guide serves as a guide means for the web 16 at its slotted end 34. It will be observed that guide 42 also serves as a keeper in the preferred embodiment shown. Rim 18 is shown in engagement with guide pads 44 formed from a portion of the backing plate 10. In the preferred embodiment guide pads 44 comprise a discontinuous series of three annularly arranged raised portions per shoe on backing plate 10. The rim portion 18 of the brake shoe 14 constitutes an arc approaching 180 degrees cooperating with guide pads, thus the arcuate rim portion establishes the plane of operation of the brake shoe.

Ball pivoting aligning devices 22 floatingly hold the brake shoes 14 in firm, light engagement with guide pads 44. The alignment rod 46 is provided with a ball joint end 48 for cooperation with an aperture 50 provided in the backing plate 10. The other end of the alignment rod 46 extends through an aperture 52 provided in the web 16 of the shoe 14 and terminates in a circumferentially grooved end 54 which cooperates with a slotted keeper 56 fitted thereon. Slotted keeper 56 holds or locks alignment springs 58 in compression between the web 16 and the keeper 56 as well as providing means for attachment of retraction springs 36. Retraction springs 36 are attached between the anchor pin 24 and the slotted keeper 56 which tend to pivot the alignment rod 46 toward the anchor pin 24 and in so doing exerts a force toward the anchor pin on the web 16 of the shoes 14. Even though the force applied by the retraction spring 36 is not in alignment with the web 16 the force applied by the retraction spring through the alignment rod 46 can only be in alignment with the web 16. The force applied by retraction spring 36 may be resolved into two components one of which is aligned with web 16 and the other normal to the web 16. The force normal to the web 16 is opposed by alignment springs 58 which urge braking shoes 14 into engagement with guide 40 and guide pads 44.

Spring loaded alignment devices have been employed to floatingly hold the brake shoes in a normal position away from the brake drum; however, the alignment rod 46 of these aligning devices does not contact the web 16 of the shoe 14. When the alignment rod 46 is pivoted due to movement of the brake shoes there is a tendency for the rod to foreshorten the distance between its circumferentially grooved end and the ball joint end thus exerting additional compression forces in the alignment springs 58. While this additional force in alignment spring 58 is not usually sufficient to cause binding between the guide pads 44 and rims 18, any additional forces imposed by the retraction springs or frictional engagement of the alignment rod with the web tend to cause friction binding between the brake shoes and the backing plate. In order to provide friction-free operation between the web 16 and the alignment rod 46 there is provided a clip type bearing bushing 62 as shown in FIGS. 3 to 5. The clip type bearing bushing 62 has a raised bearing surface 64 for engagement with the alignment rod 46 and a seat portion 66 for engagement with alignment springs 58. It will be noted that the bearing bushing in FIGS. 3 and 5, in addition to the seat portion and raised bearing portion is further provided with a grooved flanged portion 68 for cooperation with the adjustment cable 70 of the well known automatic brake adjuster mentioned hereinbefore.

Ordinarily, brakes of the type described herein would require separate retraction and aligning devices. Moreover, the retraction means presently employed in this art are subject to wear and subsequent misalignment. The retraction and alignment means herein provided have been combined without the necessity of additional elements. Not only has a number of structural elements been eliminated but new elements ordinarily employed have been made to serve a dual purpose to achieve a more desirable and improved result. The novel bearing bushing 62 is so arranged that any forces imposed upon the web 16 of the shoes 14 must be in axial alignment with the web. The novel keeper serves as a spring loaded lock or retainer for maintaining alignment springs 58 in their normal and concentrically aligned position by providing a seating surface 72 thereon. The spring loaded keepers are easily removed and provide better access to the brake shoes for maintenance purposes.

While the preferred embodiment employs raised bearing bushings with spring seats, other types of bearings would appear obvious to those skilled in the art now that the cooperation of elements has been explained. The invention should not be limited to the particular structural details as equivalents will suggest themselves to those skilled in the art now that the novel combination is set forth. It is accordingly desired that the appended claims be given a broad interpretation commensurate with the scope of the invention in the art.

What is claimed is:

1. In a drum type brake; a backing plate fixed to prevent rotational movement; an anchor pin affixed to said backing plate; a brake shoe having an arcuate rim section and an attached web section; said rim section being slidably engaged with raised bearing pad portions on said backing plate; said web section being slidably guided for engagement with said anchor pin; an alignment device for supporting, aligning and retracting said brake shoe comprising: an alignment rod pivotally mounted through said backing plate at one end and extending through an aperture in said web at the other end, a bearing bushing mounted in said aperture in said web between said rod and said web having a raised bearing portion engaging said alignment rod at the neutral axis of said web; an alignment spring mounted concentrically on said alignment rod between said web section of said brake shoe and the other end of said alignment rod urging said brake shoe in engagement with said bearing pad portion of said backing plate, and a retraction spring attached to said anchor pin and to said other end of said alignment rod for urging said brake shoe to disengage said drum with a force transmitted to said web in axial alignment therewith.

2. A brake shoe retraction device for disengaging brake shoes from a drum type brake comprising, an anchor pin attached to a backing plate, pivotal alignment rods inserted through apertures in said backing plate and provided with pivot bearing means on one end for engagement with said backing plate, brake shoes having arcuate rim sections and web sections attached to the rim sections, bearing bushings mounted in apertures in said web sections and adapted to provide a bearing surface for engagement with said alignment rods at a point inside said aperture of said web, alignment springs mounted concentrically with said alignment rod, keepers fitted on the other end of said alignment rod for holding said alignment springs in compression between said keeper and said bearing bushing to spring urge said brake shoes in engagement with guide pads on said backing plate, and retraction springs attached to said anchor pin and said keepers for urging said brake shoes to a retracted position in engagement with said anchor pin by transmitting said spring force to the bearing bushings in the web of said shoes in axial alignment with said web of said shoes.

3. A brake shoe retraction device as set forth in claim 2 which further includes a flanged guide on one of said bearing bushings for supporting and operating on an automatic brake adjuster cable fitted into said flanged guide.

4. In a drum type brake a brake shoe retracting, aligning and supporting device comprising, a backing plate, a stub anchor on said backing plate, a brake shoe movably mounted on said backing plate for engagement with said anchor, said brake shoe comprising an arcuate rim attached to a flat web, said rim of said shoe being slidably engaged on said backing plate and an end of said web being slidably engageable with said stub anchor, an alignment rod pivotally mounted through an aperture in said backing plate at its pivoted end and extending through an aperture in said web at its outer end, a bearing bushing mounted in said aperture in said web for engagement with said alignment rod, an alignment spring concentrically mounted on the outer end of said alignment rod, a slotted keeper fitted to the end of said outer end of said alignment rod compressing said alignment spring between said keeper and the web of said shoe supporting and aligning said shoe in frictional engagement with said backing plate, and a retraction spring connected between said keeper and stub anchor exerting a retraction force on the outer end of said alignment rod which in turn exerts a retraction force on, and in axial alignment with, the web of said shoe whereby the alignment rod serves to support, align and retract the brake shoe.

5. A brake shoe retracting and aligning device for a drum type brake comprising,
a backing plate having an anchor pin and guide plate means;
an arcuate rim of a brake shoe mounted in floating and sliding engagement with said guide plate means;
a web of said brake shoe attached to said arcuate rim adapted for engagement with said anchor pin;
support elignment means for floatingly supporting said brake shoe rim in frictional engagement with said backing plate guide means, said support alignment means comprising, an alignment rod pivoted at one end on said backing plate and engagably fitted through an aperture in said web of said brake shoe, spring means mounted between said web and the other end of said alignment rod for urging said rim of said brake shoe into frictional engagement with said backing plate guide means, a bushing bearing concentrically mounted in said aperture of said web of said brake shoe coacting between said alignment rod and said web, said bearing bushing having a grooved flange thereon for operable engagement with a slack adjustment cable fitted in the groove of said flange;
and a retraction spring attached between said support alignment rod and said anchor pin for urging said brake shoe web into engagement with said anchor pin by a force in axial alignment with and applied to the web of said brake shoe.

References Cited

UNITED STATES PATENTS

| | | | |
|---|---|---|---|
| 2,095,753 | 10/1937 | La Brie | 188—78 X |
| 2,251,854 | 8/1941 | Parnell et al. | 188—216 |
| 2,976,958 | 3/1961 | Scholl | 188—79.5 |
| 3,003,591 | 10/1961 | Rike | 188—78 |
| 3,061,051 | 10/1962 | Swift | 188—78 |

DUANE A. REGER, *Primary Examiner.*

EUGENE BOTZ, MILTON BUCHLER, *Examiners.*

R. D. BLAKESLEE, *Assistant Examiner.*